United States Patent
Lim et al.

(10) Patent No.: US 12,210,377 B2
(45) Date of Patent: Jan. 28, 2025

(54) COMPUTING DEVICE CASE

(71) Applicant: LENOVO (SINGAPORE) PTE. LTD., Singapore (SG)

(72) Inventors: Ghwang Hyun Lim, Morrisville, NC (US); Jung Hwan Hong, Morrisville, NC (US); Ali Ent, Morrisville, NC (US); Alden Rose, Morrisville, NC (US); Jeffrey E Skinner, Morrisville, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 56 days.

(21) Appl. No.: 17/954,967

(22) Filed: Sep. 28, 2022

(65) Prior Publication Data

US 2024/0103569 A1 Mar. 28, 2024

(51) Int. Cl.
*G06F 1/16* (2006.01)
*H05K 5/00* (2006.01)
*H05K 7/00* (2006.01)

(52) U.S. Cl.
CPC .......... *G06F 1/1616* (2013.01); *G06F 1/1607* (2013.01); *G06F 1/1654* (2013.01); *G06F 1/1681* (2013.01); *G06F 2200/1632* (2013.01)

(58) Field of Classification Search
CPC .... G06F 1/1616; G06F 1/1607; G06F 1/1654; G06F 1/1681; G06F 1/1632
See application file for complete search history.

(56) References Cited

U.S. PATENT DOCUMENTS

| | | | | |
|---|---|---|---|---|
| 8,498,100 | B1* | 7/2013 | Whitt, III | H05K 5/0234 361/679.28 |
| 9,654,164 | B2* | 5/2017 | Irci | H01Q 1/243 |
| 10,664,012 | B1* | 5/2020 | Zimmerman | G06F 1/1632 |
| 2010/0110629 | A1* | 5/2010 | Dietz | A45C 11/00 361/679.55 |
| 2012/0106078 | A1* | 5/2012 | Probst | G06F 1/1681 361/679.56 |
| 2012/0140396 | A1* | 6/2012 | Zeliff | G06F 1/1628 361/679.09 |
| 2015/0185783 | A1* | 7/2015 | Hui | G06F 1/1624 361/679.29 |
| 2017/0009934 | A1* | 1/2017 | van Hooft | G06F 1/1616 |
| 2018/0074553 | A1* | 3/2018 | Yamazaki | H10K 77/111 |
| 2020/0133351 | A1* | 4/2020 | Gault | G06F 1/1618 |
| 2022/0236765 | A1* | 7/2022 | Zimmerman | G06F 1/166 |

FOREIGN PATENT DOCUMENTS

WO   WO-2021216057 A1 * 10/2021  ........... G06F 1/1616

* cited by examiner

*Primary Examiner* — Anthony M Haughton
(74) *Attorney, Agent, or Firm* — Brian J. Pangrle

(57) ABSTRACT

A case can include a base that includes at least one input device; a display device holder; a hinge that couples the base and the display device holder; and a flexible back end that automatically extends backwardly responsive to opening rotation of the display device holder with respect to the base via the hinge.

19 Claims, 8 Drawing Sheets

COMPUTING DEVICE CASE

TECHNICAL FIELD

Subject matter disclosed herein generally relates to technology for computing devices.

BACKGROUND

Various types of computing devices have one or more housings. For example, a tablet computing device (e.g., a tablet) can have a single housing with a display and a notebook computing device (e.g., a notebook) can have two housings where one of the housings is a display housing and the other one of the housings is a keyboard housing where the two housings are coupled by a hinge assembly.

SUMMARY

A case can include a base that includes at least one input device; a display device holder; a hinge that couples the base and the display device holder; and a flexible back end that automatically extends backwardly responsive to opening rotation of the display device holder with respect to the base via the hinge. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
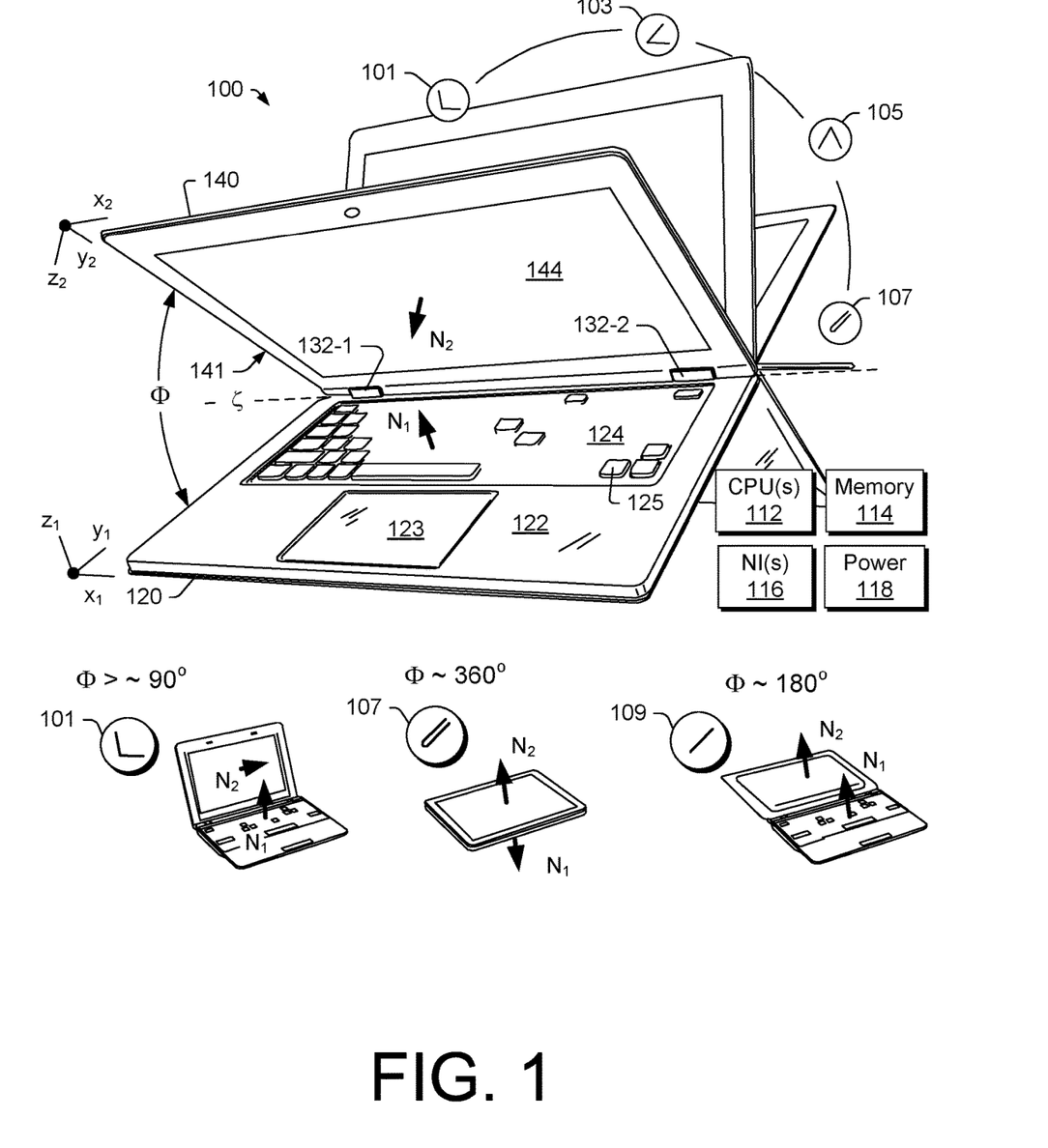
FIG. 1 is a series of diagrams of an example of a device.

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a system such as, for example, a computing system (e.g., an information handling device, etc.).

As an example, the device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 141 with a display surface 144. In such an example, the keyboard 124 is defined in a first Cartesian coordinate system as having a width along an x-axis ($x_1$), a depth along a y-axis ($y_1$) and a height or thickness along a z-axis ($z_1$) that extends in a direction outwardly away from touch surfaces of keys 125 of the keyboard 124 and the display 141 is defined in a second Cartesian coordinate system as having a width along an x-axis ($x_2$), a depth along a y-axis ($y_2$) and a height or thickness along a z-axis ($z_2$) that extends in a direction outwardly away from the viewing surface 144 of the display 141. As an example, a coordinate system may be right-handed or left-handed. In various examples, a footprint may be defined by an area such as an area in an x,y-plane.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing system. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 141 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing system to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 141 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 141 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 (e.g., normal to an $x_1,y_1$-plane) and a normal outward vector $N_2$ of the display 141 of the display housing 140 (e.g., normal to an $x_2,y_2$-plane) are oriented in oppositely pointing directions, pointing away from each other; whereas, in contrast, for a closed orientation of the device 100 (e.g., where the angle $\Phi$ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis $\zeta$) and then rotate the keyboard housing such that the keys face the back side of the display in a folded orientation. In such an example, a single centrally located hinge provides symmetry such that a computing system can be aligned in a clamshell closed orientation and a tablet orientation, optionally with the keys of the keyboard housing facing the back side of a display of a display housing.

The orientation 109 may be a planar orientation where the angle $\Phi$ is about 180 degrees such that a normal outward vector $N_1$ of the keyboard 124 of the keyboard housing 120 and a normal outward vector $N_2$ of the display 141 of the display housing 140 are oriented in approximately the same pointing directions.

Various computing systems such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
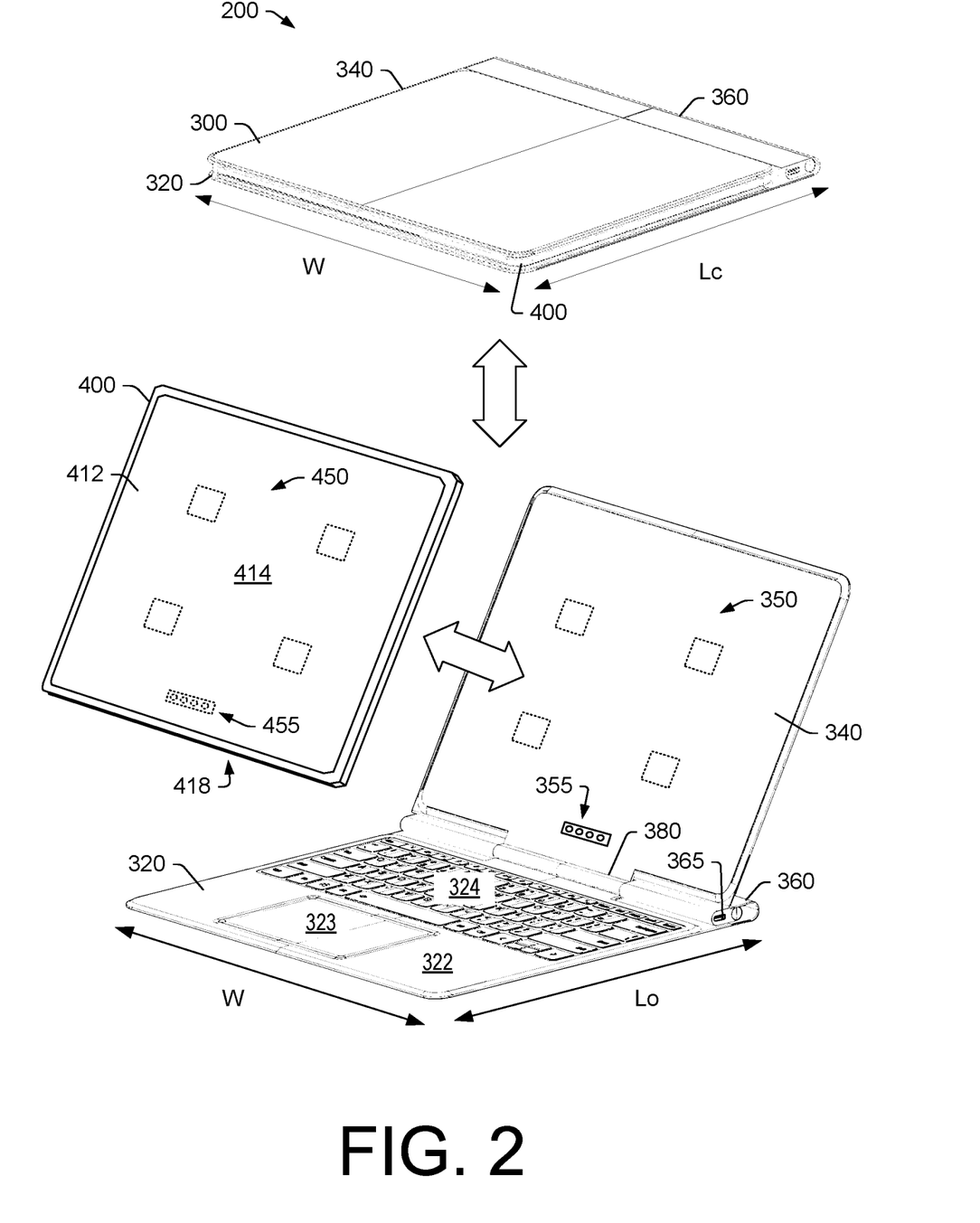
FIG. 2 is a series of perspective views of an example of a system.

FIG. 2 shows an example of a system 200 that includes a case 300 and a display device 400 where the case 300 includes a flexible back end 360 and a hinge 380 where upon a transition from a closed position of the case 300 to an open position of the case 300 via the hinge 380, the flexible back end 360 extends backwardly away from the hinge 380. In such an example, a length of the case 300 becomes longer as indicated by a closed length Lc and an open length Lo where Lo is greater than Lc. As shown, the case 300 can be defined by a width W, which can remain substantially constant upon a transition from closed to open or open to closed. In such an example, the footprint of the case 300 is variable due to the flexible back end 360, which can help to support the display device 400 when coupled to the case 300.

As shown in the example of FIG. 2, the case 300 can include a base 320 and a display device holder 340 that are coupled via the hinge 380. As shown, the base 320 can include a palm rest 322, a touchpad 323 and a keyboard 324 with keys and the display device holder 340 can include magnetic material 350 and optionally a connector 355. In such an example, the display device 400 can include magnetic material 450 and optionally a connector 455 where the display device 400 can magnetically couple to the display device holder 340 via magnetic attraction force between the magnetic materials 350 and 450 and optionally electrically couple to the display device holder 340 via electrical contacts of the connectors 355 and 455. As an example, the connectors 355 and 455 may provide for transmission of one or more of data and power. In the example of FIG. 2, the display device 400 can couple to the case 300 via a magnetic attraction force that can utilize one or more magnets such as, for example, one or more permanent magnets, and optionally one or more magnetic materials that include one or more ferromagnetic materials. For example, the case 300 can include one or more permanent magnets and the display device 400 can include iron or another suitable ferromagnetic material (e.g., cobalt, nickel, a rare-earth metal, etc.).

As an example, the case 300 can include wired and/or wireless circuitry such that one or more human input devices of the case 300 can be utilized to instruct a display device such as the display device 400, which can be a computing device that includes one or more features of the device 100 of FIG. 1 (see, e.g., blocks 112, 114, 116 and 118). In the example of FIG. 2, the case 300 is shown as including a connector 365, which may be, for example, a power and/or data connector. As an example, the connector 365 may be a USB type of connector (e.g., USB type C, etc.). As an example, circuitry of the case 300 may be electrically powered via power supplied to the case 300 via the connector 365, noting that the case 300 may include a battery and associated battery circuitry such that power may be supplied via the battery. As an example, the case 300 may include one or more connectors, which may, for example, be appropriately located. For example, the connector 365 may provide for power and/or data communication with the connector 355, which may provide for power and/or data communication with the connector 455. As an example, the connector 365 may receive a plug of a cable where another plug of the cable can connect to a connector of the display device 400 for transmission of data and/or power. As an example, the case 300 may include features that can extend capabilities of the display device 400. As an example, the case 300 may include features such as dock or docking features such that the case 300 can be utilized as a display device dock.

In the example of FIG. 2, the display device 400 is shown as being a tablet such as a tablet computing device that includes a display 412 that defines a display side 414 and that includes a back side 418 that is opposite the display side 414. The display device 400 may be rectangular in shape with two longer edges and two shorter edges. As shown in the example of FIG. 2, the display device 400 may be coupled to the case 300 in a landscape position; noting that a portrait position may optionally be utilized where magnetic material and connectors, if present, may align. As explained, the case 300 includes the flexible back end 360 which can help to support the display device 400 when coupled to the case 300 when the case 300 is in an open position. In particular, by extending the length of the case 300 via the flexible back end 360, the display device holder 340 can be angled backward beyond an angle of 90 degrees with a reduced risk of the system 200 tipping backwards. As the center of gravity of the display device 400 may be elevated in a portrait position when compared to a landscape position, the flexible back end 360 may provide for support such that risk of the system 200 tipping backwards is also reduced in a portrait position (e.g., compared to a case where the length remains constant upon transitioning from a closed position to an open position or vice versa).

Figure 3:
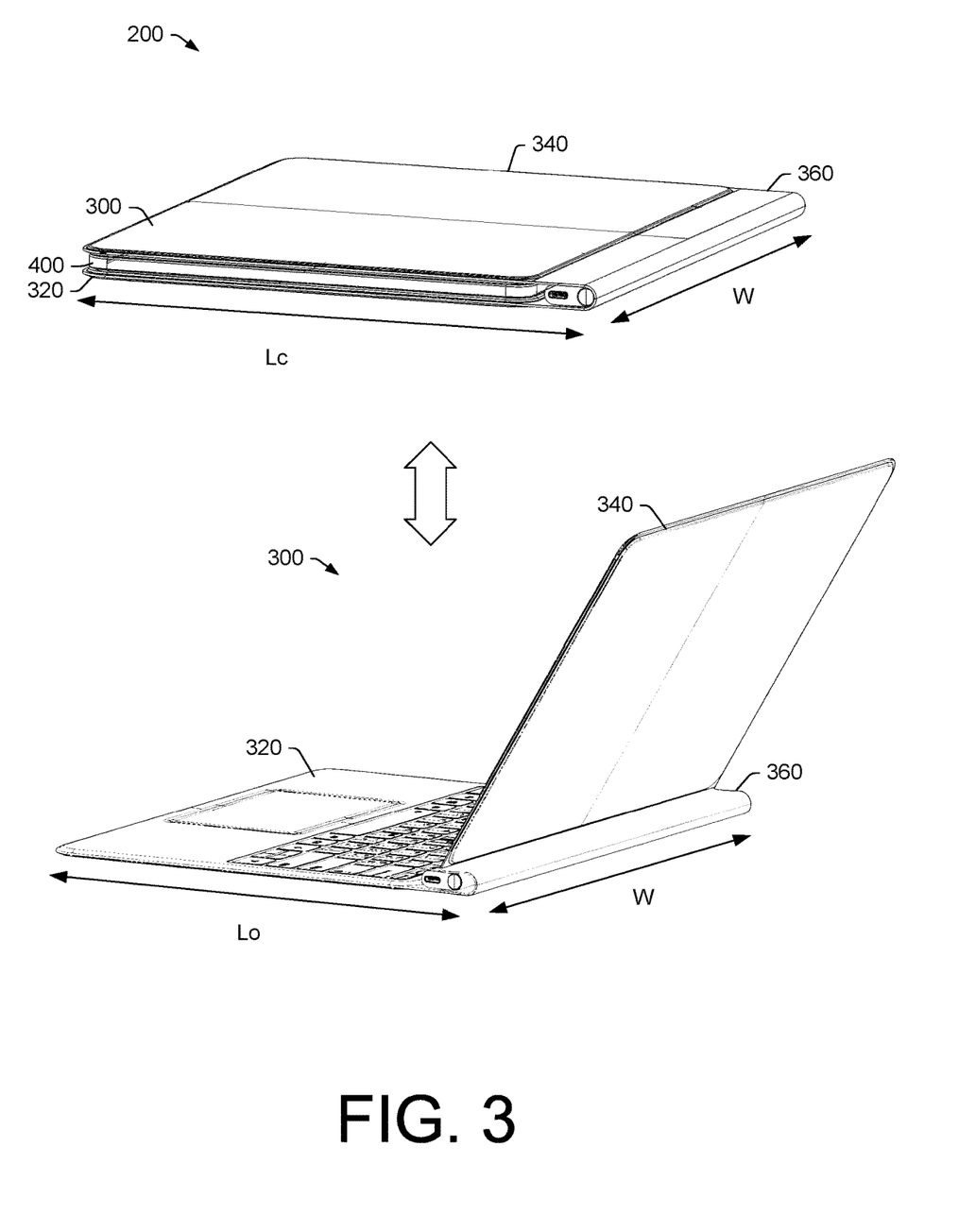
FIG. 3 is a series of perspective views of an example of a system.

FIG. 3 shows the system 200 in a closed position and the case 300 in an open position without the display device 400. As shown, in the open position, the case 300 has a greater length than in the closed position where the increase in length is backwardly, for example, to the rear of an axis or axes of the hinge 380. Such an approach can increase the footprint of the base 320 of the case 300 to provide for added stability when the case 300 is utilized to support a display device (e.g., in a landscape position, a portrait position, etc.).

Figure 4:
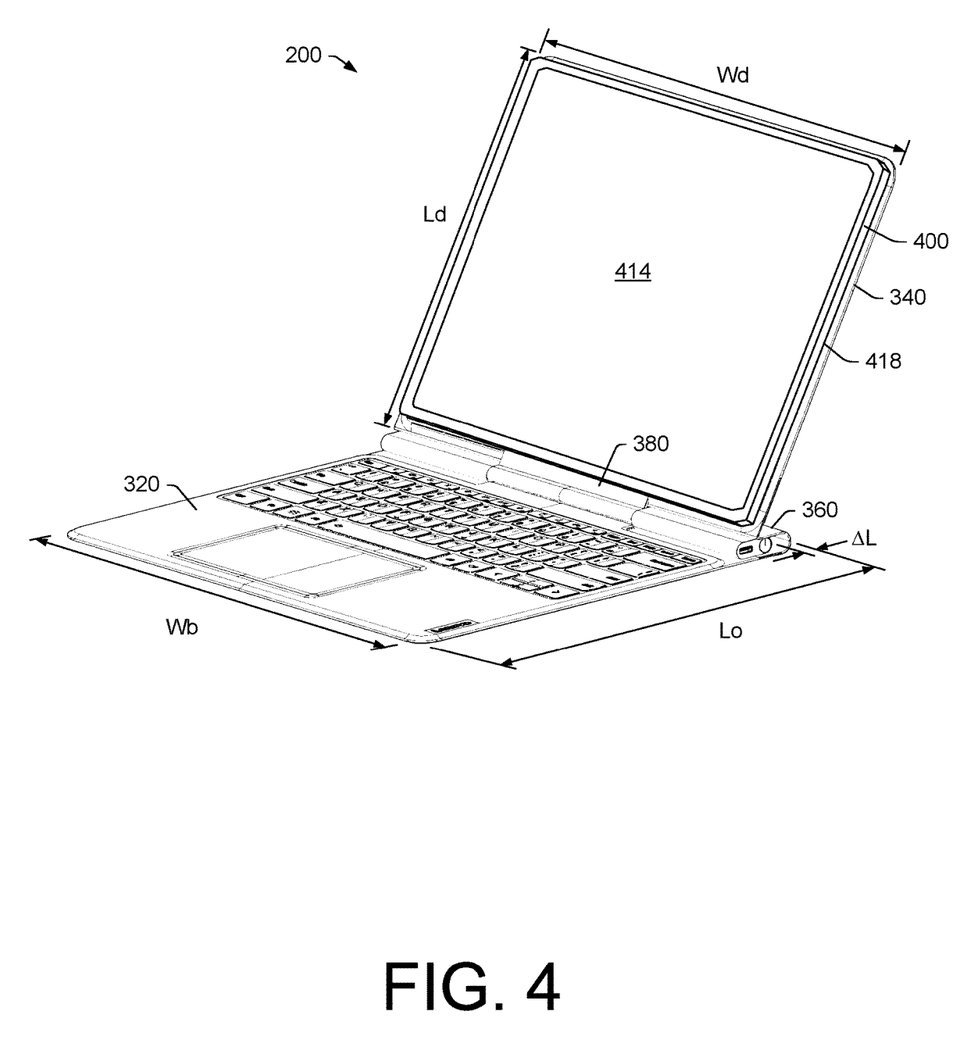
FIG. 4 is a perspective view of an example of a system.

FIG. 4 shows the system 200 in an open position at an angle greater than 90 degrees along with various dimensions including a width of the base Wb, a width of the display device Wd and a length of the display device Ld. Also shown in FIG. 4 is a dimension ΔL, which is an increased length of the case 300 (e.g., the base 320 of the case 300) in the open position. In the example of FIG. 4, the length Lo is greater than the length Ld, noting that the length Lo minus ΔL can also be greater than the length Ld.

In the example of FIG. 4, the hinge 380 can be a friction hinge that can provide a sufficient amount of friction to maintain the display device 400 as coupled to the display device holder 340 of the case 300 in a desired open position (e.g., an angle greater than 90 degrees). As an example, the hinge 380 may be limited in its range of motion. For example, for a given display device with an assumed center of gravity that is the same as its geometric center, for a given size of such a display device that may be approximately the size of the display device holder 340 receiving portion and for a given size and mass of the base 320, a force balance can be computed where the center of gravity may apply a torque about a rotational axis where the flexible back end 360 can extend backwardly from the rotational axis a particular distance to "balance" the torque at a maximum angle of the display device holder 340 with respect to the base 320 as may be limited by the hinge 380. For example, the hinge 380 may limit an opening angle to approximately 135 degrees or, for example, to a maximum angle in a range between 110 degrees and 135 degrees. As an example, a limiting angle may be approximately 130 degrees or, for example, 125 degrees. In various instances, a user may utilize a lesser opening angle when the base 320 of the case 300 is supported on a substantially horizontal surface (e.g., a desktop, a tabletop, a countertop, etc.) than when the base 320 of the case 300 is supported on a user's lap.

As an example, the case 300 may be suitable for use on a horizontal surface or a user's lap. As to a user's lap, as the flexible back end 360 is flexible, it may be relatively comfortable when contacting a user's legs when compared to a hard, inflexible base. Further, such a flexible back end 360 may be less likely to damage clothing of a user compared to a hard, inflexible base.

Figure 5:
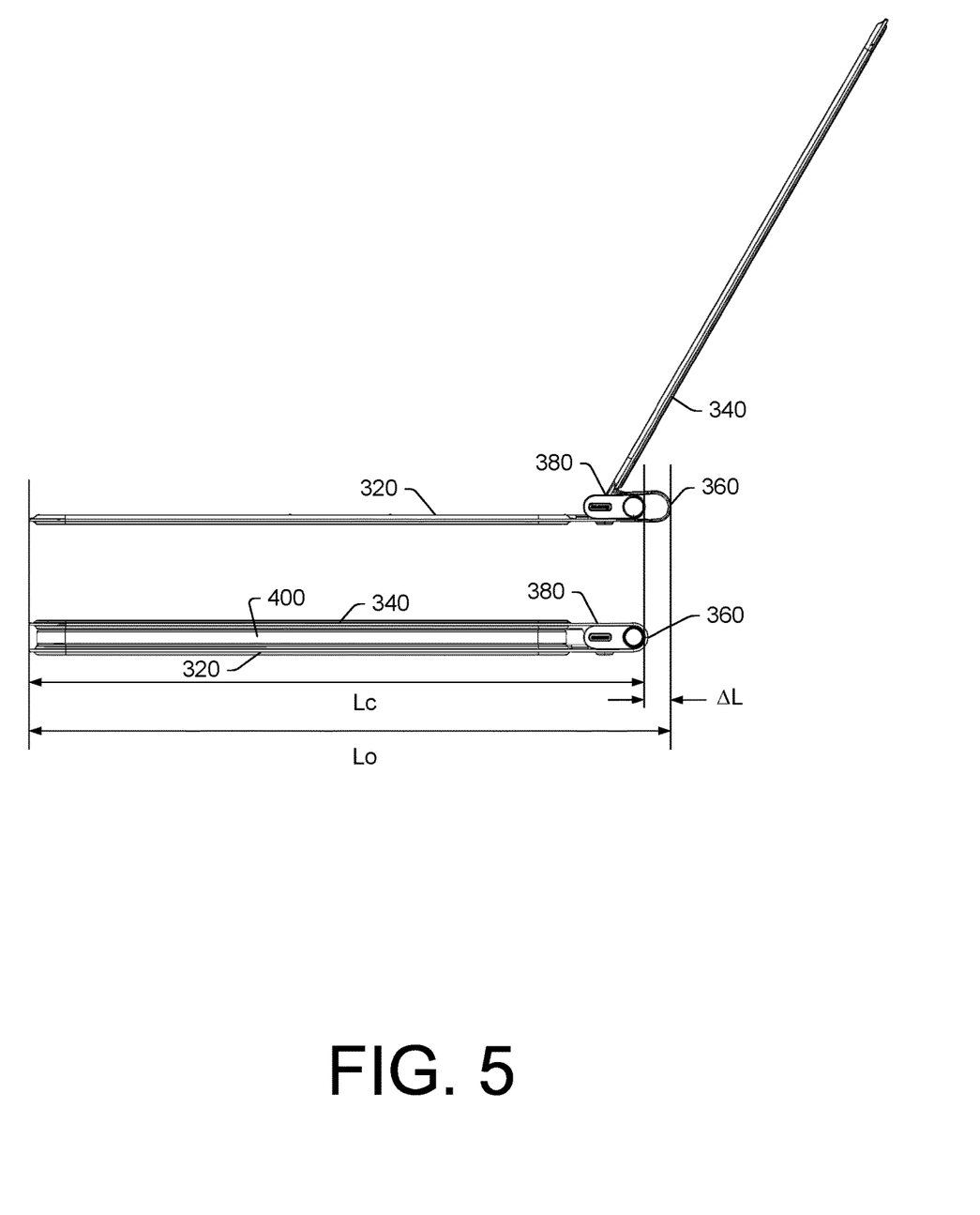
FIG. 5 is a series of side views of an example of a system.

FIG. 5 shows a side view of the case 300 in an open position and a side view of the case 300 with the display device 400 in a closed position. As shown, in the open position, the base 320 is extended by a length ΔL due to the flexible back end 360. In the example of FIG. 5, the display device 400 has a thickness that can space the base 320 and the display device holder 340 by a suitable distance where the base 320 and the display device holder 340 may be substantially parallel. In the example of FIG. 5, the case 300 may, at the hinge 380, be of a thickness that is approximately equal to or slightly greater than a thickness of a display device such as, for example, the display device 400.

Figure 6:
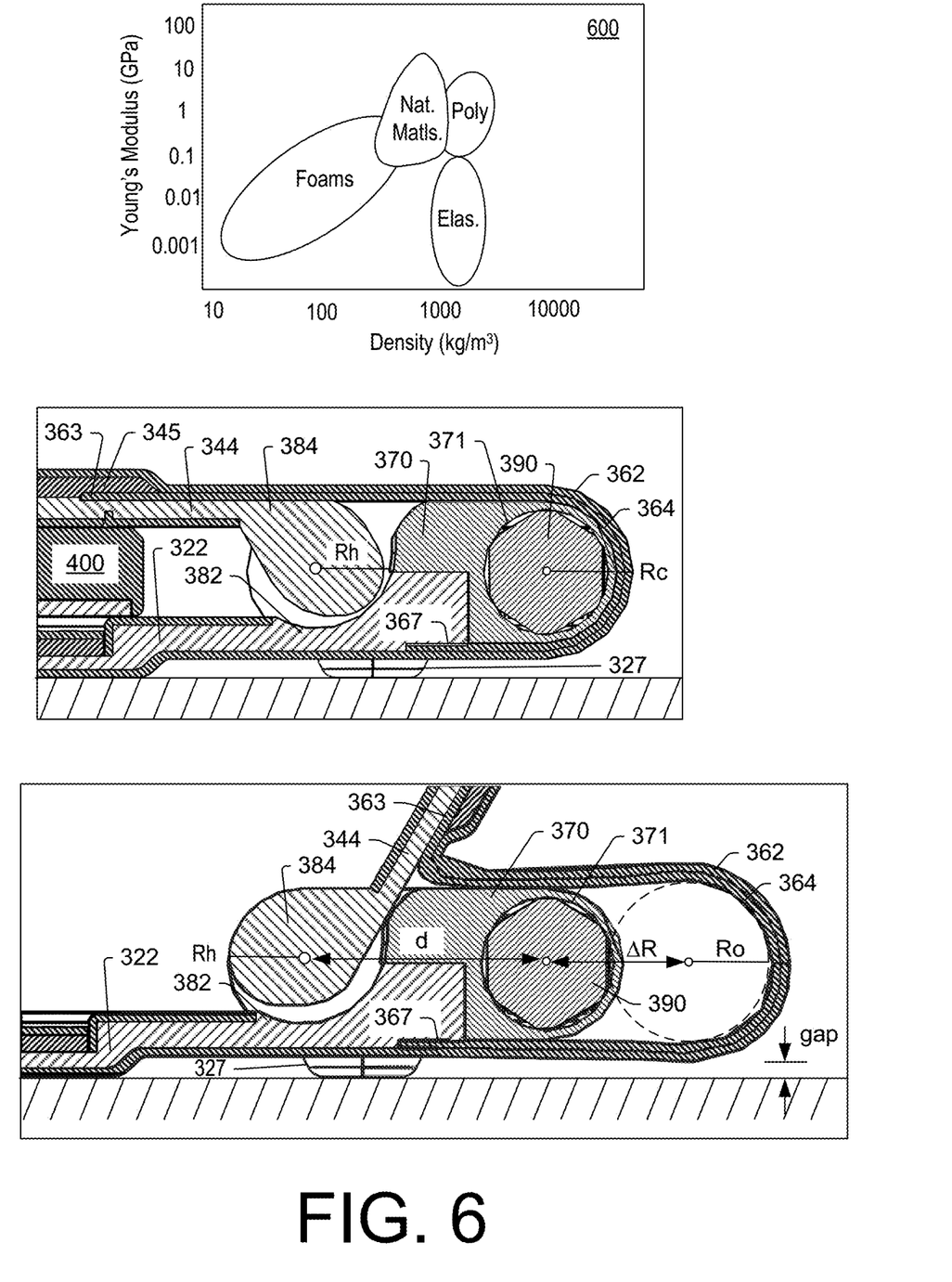
FIG. 6 is an example plot of material properties and a series of a cut-away views of an example of a portion of a system.

FIG. 6 shows an example plot 600 and approximate cut-away views of a portion of an example of the case 300 in a closed position with the display device 400 and in an open position where the display device is not within the view. As shown, the hinge 380 can include a rotatable portion 384 that rotates with respect to a seat 382 where the rotatable portion 384 is part of or coupled to a support plate 344 of the display device holder 340 and where the seat 382 is part of or coupled to a support plate 322 of the base 320. As shown, the display device holder 340 can include padding 345, which may be a protective layer of material that can help to cushion the display device 400 when coupled to the case 400.

In FIG. 6, the plot 600 shows approximate ranges of Young's modulus and density for various materials, including foams, elastomers, polymers and natural materials; noting that various materials may be types of polymers. A material may be characterized by its stiffness, which represents resistance to elastic deformation. Young's modulus can be defined as stress divided by strain; thus, for a given stress, if the Young's modulus is high, then elastic deformation tends to be small. In various instances, stiffness and Young's modulus are proportional. As shown in the plot 600 of FIG. 6, for the materials, the Young's modulus ranges from approximately 0.0001 GPa to approximately 10 GPa.

As an example, a case can include a flexible back end that is made from one or more materials where the flexible back end exhibits sufficient stiffness for support in an open position and sufficient flexibility to change shape automatically responsive to a transition from a closed position to an open position and back again. As an example, a flexible back end can have a stiffness characterized via a Young's modulus where the Young's modulus may be, for example, approximately 0.01 GPa or more and less than approximately 10 GPa. As a point of reference, sole leather naturally tanned for footwear can have a density of approximately 0.9 $g/cm^3$, a Young's modulus of approximately 0.3 GPa (300 MPa) and a Poisson's ratio of approximately 0.2. As an example, a material may be a type of material suitable as footwear material such as, for example, an upper material and/or a sole material. As an example, a layer of material may be relatively thin, for example, between 0.1 mm and 5 mm. As an example, behavior of a layer of material may be tailored through selection of the type of material and its thickness. As an example, a material may be selected to be relatively stable over an expected temperature range (e.g., 10 degrees C. to 40 degrees C.).

In the example of FIG. 6, a curved member 370 is coupled to the hinge 380, noting that the curved member 370 may be integral to the seat 382 of the hinge 380. As shown, the curved member 370 can include a bore 371 that can define a stylus socket for receipt of a stylus 390.

In the example of FIG. 6, various dimensions are shown including a hinge radius Rh, a closed radius Rc and an open radius Ro, along with a dimension ΔR that corresponds to a shift of an origin of the radius Rc to an origin of the radius Ro. In the example of FIG. 6, a rotational axis of the hinge 380 may be at approximately the same level (e.g., height) as the origins of the radii Rc and Ro.

As shown, the radius Ro is greater than the radius Rc. For example, the case 300 can include one or more layers of flexible material 362 and 364 that can be pushed backward and bulged outwardly upon opening of the case 300. Upon bulging, the one or more layers of flexible material 362 and 364 may extend downwardly. For example, the case 300 can include one or more feet 327 that may raise the back end of the case 300 a relatively small distance where the one or more feet 327 may be disposed approximately under a rotational axis of the hinge 380. In such an approach, a gap can exist such that the flexible back end 360 can bulge without applying a force that would be strong enough to lift the back end of the case 300. For example, the flexible back end 360 can bulge to a larger radius upon transitioning of the case 300 from a closed position to an open position with or without direct contact of the flexible back end 360 and a support surface, which may depend on an angle of tilt of the display device holder 340 with the display device 400 coupled thereto. In the instance that contact is made, force may be applied by the flexible back end 360 to the support surface where the force is less than a force that would vertically lift the foot of the one or more feet 327 as shown in the view of the example of FIG. 6.

As an example, the one or more layers of flexible material 362 and 364 may experience a deformation force as the display device holder 340 is rotated to an open position. As shown in the example of FIG. 6, the one or more layers of flexible material 362 and 364 can slide over the curved member 370 such that a portion of the one or more layers of flexible material 362 and 364 no longer contact a portion of the curved member 370. As shown, the one or more layers of flexible material 362 and 364 can be fixed or otherwise anchored while having a portion between anchors (see, e.g., anchors 363 and 367) that can be free such that deformation can occur such that the one or more layers of flexible material 362 and 364 can extend backwardly to lengthen the length of the case 320 in a direction that is aft of the rotational axis or axes of the hinge 380.

As shown in the example of FIG. 6, the curved member 370 can extend a distance backwardly from the rotational axis or axes of the hinge 380, which may be approximately a sum of a distance indicated by a dimension d and the radius Rc. Thus, while the case 300 has a portion that extends backward behind a hinge axis, the flexible back end 360 can increase that portion by a distance ΔL, which may be at least a 25 percent increase. For example, ΔL can be at least 25 percent of a sum of d and Rc.

As to material that can be utilized for the one or more layers of flexible material, consider a natural material such as leather and/or a synthetic material. As to synthetic material, consider plastic (e.g., PVC, polyurethane, etc.). As an example, a plastic may be a foam. As an example, one or more foam layers may be included, which may provide a suitable ergonomic feel while being able to extend backwardly. As an example, a foam may be utilized in combination with a natural material. As an example, a material may be selected based on a Young's modulus. As an example, a material may provide for some amount of reshaping while remaining relatively resilient to provide adequate support to diminish risk of a system tipping backwardly.

Natural leather may be utilized for its ability to change shape responsive to force. As an example, natural leather can be made to either stiffen or can be made to be flexible and retain a new shape. Natural leather finds use in footwear as both feet of a wearer are rarely exactly the same size and shape and, with a little wear, natural leather can adapt responsive to force to improve fit.

Figure 7:
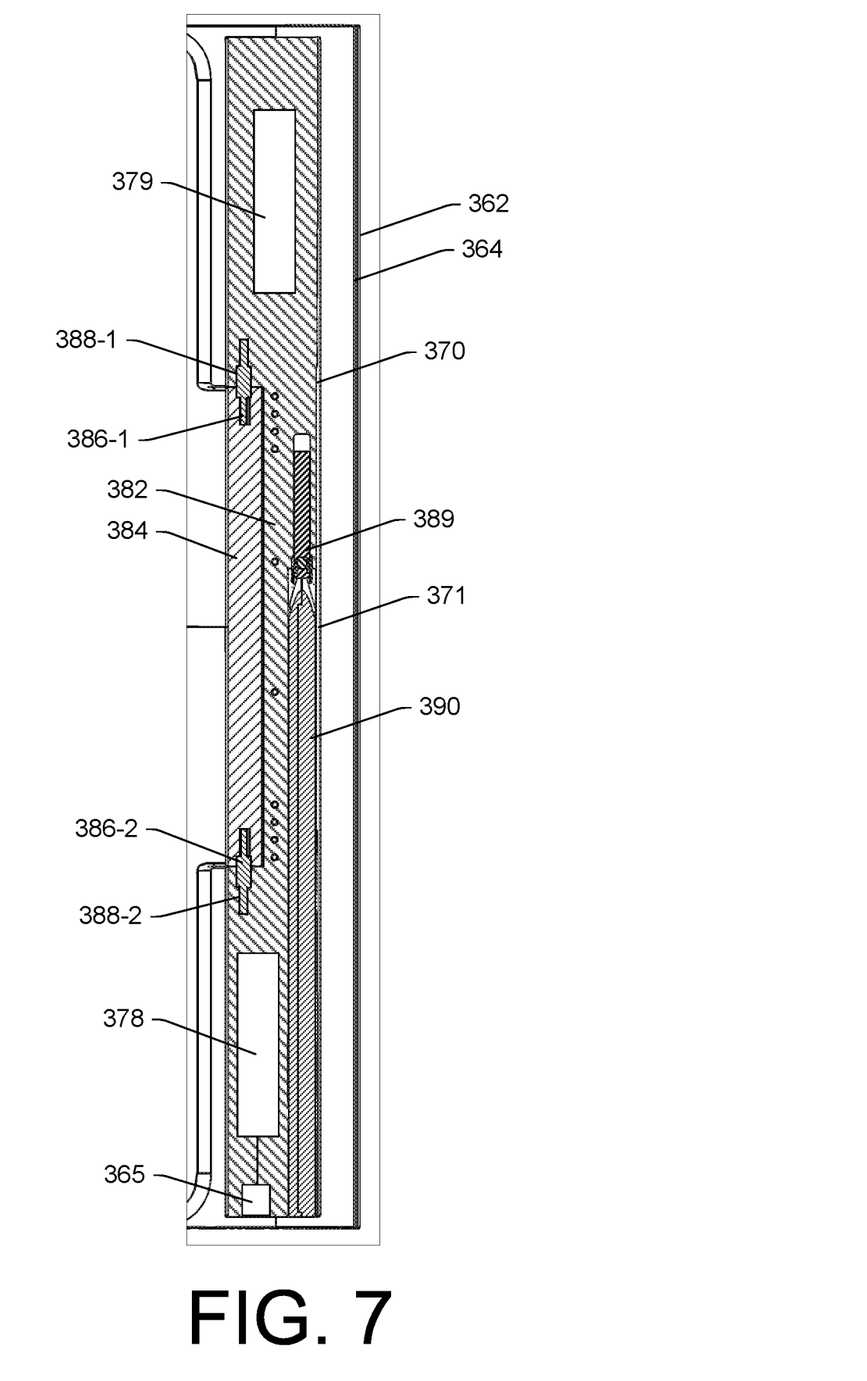
FIG. 7 is a cut-away view of an example of a portion of a case.

FIG. 7 shows a cut-away view of an example of a portion of the case 300. As shown in the example of FIG. 7, the hinge 380 can include the rotatable portion 384 that rotates with respect to the seat 382. In the example of FIG. 7, the seat 382 may be integral with the curved member 370 where the bore 371 is shown as including the stylus 390 seated therein. As an example, the bore 371 can include a push-push mechanism 389 at a closed end that can clasp an end of the stylus 390 such that the stylus 390 does not accidently fall out of the case 300.

As shown, the case 300 can include one or more types of embedded circuitry 378 and 379, which may include a battery, a processor, memory, etc. In such an example, the connector 365 may be electrically coupled with the circuitry 378 and/or 379, for example, for communication of power and/or data. As an example, the stylus 390 may include a battery or other charge holding circuitry that can be charged by the case 300, for example, consider charging via a battery of the case 300, the connector 365 of the case 300, etc.

As shown in the example of FIG. 7, the hinge 380 can include axles 386-1 and 386-2 that are received by bores or bushings 388-1 and 388-2. In the example of FIG. 7, the case 300 is in an open position as indicated by the one or more layers of flexible material 362 and 364 as being a positioned a distance from the curved member 370.

As an example, the case 300 can be without a kickstand as the flexible back end 360 can provide for support when the case 300 is in an open position. As explained, the flexible back end 360 can operate automatically to extend backwardly responsive to transition of the case 300 from a closed position to an open position. Further, the flexible back end 360 can extend backwardly in a manner that depends on open position. For example, as the display device holder 340 is rotated open with respect to the base 320, the one or more layers of flexible material 362 and 364 of the flexible back end 360 can increasingly slide backward to gather and bulge to increase support against risk of backward tipping.

As an example, the case 300 may be operated using a single hand. For example, a single hand can open the display device holder 340 with or without a display device coupled thereto where the flexible back end 360 automatically extends backwardly to increase the effective footprint of the base 320, particularly in a region that is aft of a hinge axis.

As an example, a system such as the system 200 can be utilized in a tablet mode or in a laptop mode. As explained, the case 300 can be a protective case that includes one or more human input devices (HIDs) where the case 300 may be covered with a material that provides a good ergonomic feel while also being flexible at least at a back end to automatically enhance supportability of a display device when the case 300 is open.

As shown in the example of FIG. 6, the flexible back end 360 can have a semi-circular cross-sectional shape that can change in a manner whereby it extends backwardly, optionally enlarging (e.g., bulging). While various examples show a space for a stylus, the case 300 can include space for one or more types of circuitry such as, for example, a power and/or data port (e.g., USB-C, etc.), a battery, memory, wireless circuitry, etc. (see, e.g., the circuitry 378 and 379 of FIG. 7, etc.).

As an example, the case 300 may be utilized separately without a display device coupled thereto. For example, consider utilizing the case 300 as a wireless keyboard (e.g., BLUETOOTH, etc.). As an example, the display device holder 340 may be utilized as a memo board, for example, for sticky notes, etc., which may remain in place even when a display device is coupled to the display device holder 340.

As an example, a case can include a base that includes at least one input device; a display device holder; a hinge that couples the base and the display device holder; and a flexible back end that automatically extends backwardly responsive to opening rotation of the display device holder with respect to the base via the hinge.

As an example, a hinge can include an axle that defines an axis of rotation where a flexible back end is located aft of the axis of rotation. In such an example, the flexible back end can be located a first distance from the axis of rotation in a closed position of the case, where the flexible back end is located a second distance from the axis of rotation in an open position of the case, and where the second distance is greater than the first distance. As an example, consider the second distance as being at least 25 percent greater than the first distance.

As an example, a flexible back end can include a layer of flexible material. In such an example, the layer of flexible material can be anchored to a base at a base anchor and anchored to a display device holder at a display device holder anchor and unanchored in a portion between the base anchor and the display device holder anchor.

As an example, a case can include a curved member, where a portion of a layer of flexible material is slidable over a portion of the curved member.

As an example, a flexible back end can include a first radius of curvature in a closed position of a case, where the flexible back end includes a second radius of curvature in an open position of the case, and where the second radius of curvature is greater than the first radius of curvature.

As an example, a case can include a foot disposed on a bottom side of a base where, for example, the foot may elevate a flexible back end of the case by a distance in a closed position of the case. In such an example, in an open position of the case, the flexible back end may bulges to diminish the distance (e.g., to close a gap, etc.).

As an example, a hinge can include a maximum opening angle of 135 degrees of a display device holder with respect to a base.

As an example, a display device holder can include magnets and/or a display device holder can include an electrical connector.

As an example, a case can include wireless communication circuitry.

As an example, a case can include a stylus bay where, for example, the stylus bay is disposed aft of a hinge of the case.

As an example, a system can include a display device; and a case that includes a base that includes at least one input device, a display device holder, a hinge that couples the base and the display device holder, and a flexible back end that automatically extends backwardly responsive to opening rotation of the display device holder with respect to the base via the hinge, where the display device removably couples to the display device holder. In such an example, the display device holder can include magnets where the display device magnetically couples to the display device holder.

As an example, a system that includes a display device and a case can include a hinge of the case that includes an axle that defines an axis of rotation, where a flexible back end is located aft of the axis of rotation, where the flexible back end is located a first distance from the axis of rotation in a closed position of the case, where the flexible back end is located a second distance from the axis of rotation in an open position of the case, and where the second distance is greater than the first distance.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 8:
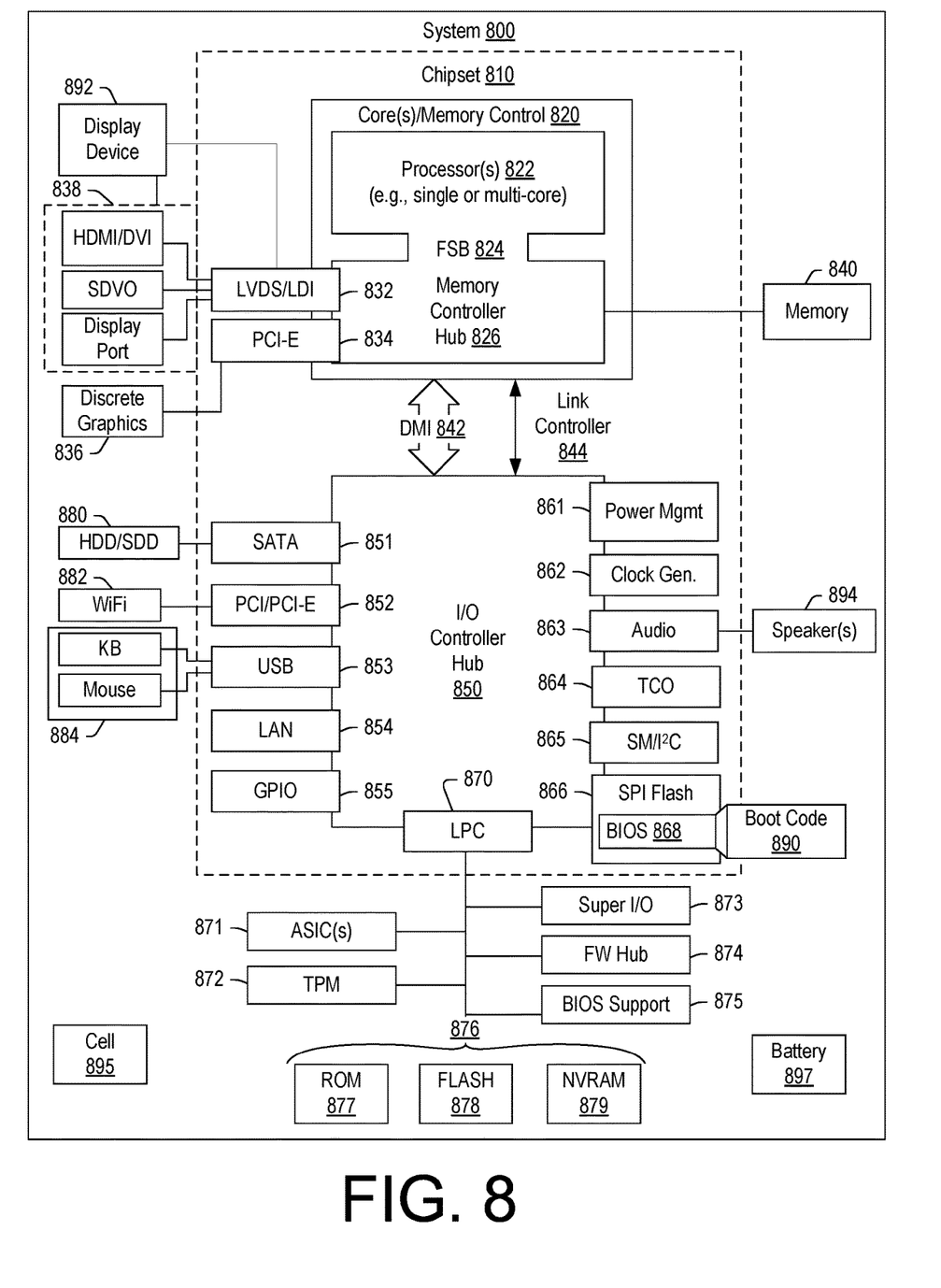
FIG. 8 is a diagram of an example of a system that includes one or more processors.

While various examples of circuits or circuitry have been discussed, FIG. 8 depicts a block diagram of an illustrative computer system 800. The system 800 may be a computer system, such as one of the LENOVO® THINKCENTRE® or LENOVO® THINKPAD® series of personal computers sold by Lenovo (US) Inc. of Morrisville, NC, or a workstation computer system, such as the LENOVO® THINKSTATION®, which are sold by Lenovo (US) Inc. of Morrisville, NC; however, as apparent from the description herein, a system or other machine may include other features or only some of the features of the system 800. As an example, a display device may include features of the system 800. As an example, a display device, which may be a computer system, may include one or more of the features of the LENOVO® IDEACENTRE® or THINKCENTRE® "all-in-one" (AIO) computing devices, which are sold by Lenovo (US) Inc. of Morrisville, NC. For example, the LENOVO® IDEACENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 8, the system 800 includes a so-called chipset 810. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors, mice and various other devices (e.g., microphones, cameras, phones, storage, media players, etc.). On or more other types of sensors may optionally rely on the USB interface 853 or another interface (e.g., $I^2C$, etc.). As to microphones, the system 800 of FIG. 8 may include hardware (e.g., audio card) appropriately configured for receipt of sound (e.g., user voice, ambient sound, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8. Further, the system 800 of FIG. 8 is shown as optionally include cell phone circuitry 895, which may include GSM, CDMA, etc., types of circuitry configured for coordinated operation with one or more of the other features of the system 800. Also shown in FIG. 8 is battery circuitry 897, which may provide one or more battery, power, etc., associated features (e.g., optionally to instruct one or more other components of the system 800). As an example, a SMBus may be operable via a LPC (see, e.g., the LPC interface 870), via an $I^2C$ interface (see, e.g., the SM/$I^2C$ interface 865), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A case comprising:
    a base that comprises at least one input device, and a left side, a right side, a front end, a curved member, and a flexible back end that define a footprint of the base;
    a display device holder; and
    a hinge that couples the base and the display device holder, wherein the hinge comprises an axle that defines a single axis of rotation, wherein the curved member extends a distance backwardly from the single axis of rotation, wherein the flexible back end is located aft of the single axis of rotation and automatically extends backwardly responsive to opening rotation of the display device holder with respect to the base via the hinge, wherein the flexible back end comprises a layer of flexible material, and wherein a portion of the layer of flexible material is slidable over a portion of the curved member during the opening rotation to increase the footprint of the base.

2. The case of claim 1, wherein the flexible back end is located a first distance from the single axis of rotation in a closed position of the case, wherein the flexible back end is located a second distance from the single axis of rotation in an open position of the case, and wherein the second distance is greater than the first distance.

3. The case of claim 2, wherein the second distance is at least 25 percent greater than the first distance.

4. The case of claim 1, wherein the layer of flexible material is anchored to the base at a base anchor and anchored to the display device holder at a display device holder anchor and unanchored in a portion between the base anchor and the display device holder anchor.

5. The case of claim 1, wherein the flexible back end comprises a first radius of curvature that is defined by a radius of curvature of the curved member in a closed position of the case, wherein the flexible back end comprises a second radius of curvature in an open position of the case, and wherein the second radius of curvature is greater than the first radius of curvature.

6. The case of claim 1, comprising a foot disposed on a bottom side of the base.

7. The case of claim 6, wherein the foot elevates the flexible back end by a distance in a closed position of the case.

8. The case of claim 7, wherein, in an open position of the case, the flexible back end bulges to diminish the distance.

9. The case of claim 1, wherein the hinge comprises a maximum opening angle of 135 degrees of the display device holder with respect to the base.

10. The case of claim 1, wherein the display device holder comprises magnets.

11. The case of claim 1, wherein the display device holder comprises an electrical connector.

12. The case of claim 1, comprising wireless communication circuitry.

13. The case of claim 1, comprising a stylus bay.

14. The case of claim 13, wherein the stylus bay is disposed aft of the hinge.

15. A system comprising:
a display device; and
a case that comprises
   a base that comprises at least one input device, and a left side, a right side, a front end, a curved member, and a flexible back end that define a footprint of the base;
   a display device holder; and
   a hinge that couples the base and the display device holder wherein the hinge comprises an axle that defines a single axis of rotation, wherein the curved member extends a distance backwardly from the single axis of rotation, wherein the flexible back end is located aft of the single axis of rotation and automatically extends backwardly responsive to opening rotation of the display device holder with respect to the base via the hinge, wherein the flexible back end comprises a layer of flexible material, and wherein a portion of the layer of flexible material is slidable over a portion of the curved member during the opening rotation to increase the footprint of the base,
wherein the display device removably couples to the display device holder.

16. The system of claim 15, wherein the display device holder comprises magnets and wherein the display device magnetically couples to the display device holder.

17. The system of claim 15, wherein the flexible back end is located a first distance from the single axis of rotation in a closed position of the case, wherein the flexible back end is located a second distance from the single axis of rotation in an open position of the case, and wherein the second distance is greater than the first distance.

18. The case of claim 1, wherein the curved member remains stationary during the opening rotation.

19. The system of claim 15, wherein the curved member remains stationary during the opening rotation.

\* \* \* \* \*